United States Patent
Modai et al.

(10) Patent No.: US 11,843,656 B2
(45) Date of Patent: Dec. 12, 2023

(54) DYNAMIC APPLICATION MOBILIZATION

(71) Applicant: Iguazio Systems Ltd., Herzliya (IL)

(72) Inventors: Ori Modai, Ramat Hasharon (IL); Orit Nissan-Messing, Hod Hasharon (IL); Yaron Haviv, Tel Mond (IL)

(73) Assignee: Iguazio Systems Ltd., Herzliya (IL)

( * ) Notice: Subject to any disclaimer, the term of this patent is extended or adjusted under 35 U.S.C. 154(b) by 0 days.

(21) Appl. No.: 15/717,937

(22) Filed: Sep. 27, 2017

(65) Prior Publication Data

US 2019/0098073 A1   Mar. 28, 2019

(51) Int. Cl.
*H04L 67/10* (2022.01)
*G06F 8/65* (2018.01)
*G06F 8/60* (2018.01)
*H04L 41/0823* (2022.01)
*H04L 41/14* (2022.01)
*H04L 41/0816* (2022.01)
*G06F 9/50* (2006.01)
*H04L 41/12* (2022.01)
(Continued)

(52) U.S. Cl.
CPC ........... *H04L 67/10* (2013.01); *G06F 8/60* (2013.01); *G06F 8/65* (2013.01); *G06F 9/5077* (2013.01); *G06F 9/5088* (2013.01); *H04L 41/0816* (2013.01); *H04L 41/0823* (2013.01); *H04L 41/12* (2013.01); *H04L 41/145* (2013.01); *H04L 41/0686* (2013.01); *H04L 41/082* (2013.01)

(58) Field of Classification Search
CPC .......... G06F 8/00–78; G06F 8/60; G06F 8/65; G06F 9/5077; G06F 9/5088; H04L 67/10–1097; H04L 41/0816; H04L 41/0823; H04L 41/12; H04L 41/145; H04L 41/0686; H04L 41/082
See application file for complete search history.

(56) References Cited

U.S. PATENT DOCUMENTS 8,117,487 B1 * 2/2012 Raut ..................... G06F 11/004
                                                      709/224
9,626,155 B2 * 4/2017 Cammarota ............. G06F 8/00
(Continued)

FOREIGN PATENT DOCUMENTS

WO   WO-2019067749 A1   4/2019

OTHER PUBLICATIONS

Ma, Ricky KK, and Cho-Li Wang. "Lightweight application-level task migration for mobile cloud computing." 2012 IEEE 26th international conference on advanced information networking and applications. IEEE, 2012. (Year: 2012).*
(Continued)

*Primary Examiner* — Kevin L Young
*Assistant Examiner* — Joanne G Macasiano
(74) *Attorney, Agent, or Firm* — Bochner PLLC; Ariel Reinitz (57) ABSTRACT

Systems and methods are disclosed for dynamic application mobilization. In one implementation, an application is modeled as a processing function. The processing function is placed at a first processing node within a processing network. One or more optimization operations are computed with respect to the processing function. The processing function is mobilized from the first processing node to a second processing node within the processing network in accordance with the one or more optimization operations.

31 Claims, 4 Drawing Sheets

(51) Int. Cl.
*H04L 41/082* (2022.01)
*H04L 41/0686* (2022.01)

(56) References Cited

U.S. PATENT DOCUMENTS

| | | | | |
|---|---|---|---|---|
| 9,923,765 | B2* | 3/2018 | Allen | H04L 41/0856 |
| 2007/0211703 | A1* | 9/2007 | Gu | H04L 45/48 370/356 |
| 2009/0319662 | A1* | 12/2009 | Barsness | G06F 9/505 709/226 |
| 2012/0030343 | A1* | 2/2012 | Ryder | G06F 9/4856 709/224 |
| 2012/0106398 | A1 | 5/2012 | Bertin et al. | |
| 2015/0381753 | A1 | 12/2015 | Morton et al. | |
| 2016/0179584 | A1* | 6/2016 | Xu | G06F 9/4856 718/104 |
| 2016/0217166 | A1 | 7/2016 | Haviv et al. | |
| 2016/0321032 | A1* | 11/2016 | Cammarota | G06F 8/00 |
| 2018/0109428 | A1* | 4/2018 | Kattepur | H04L 67/10 |
| 2018/0136984 | A1* | 5/2018 | Paola | H04L 67/10 |
| 2018/0217875 | A1* | 8/2018 | Takeuchi | G06F 9/4856 |
| 2019/0068504 | A1* | 2/2019 | Thambidorai | H04L 41/12 |
| 2020/0322229 | A1* | 10/2020 | Enguehard | G06F 9/455 |

OTHER PUBLICATIONS

Huedo, Eduardo, Ruben S. Montero, and Ignacio M. Llorente. "A framework for adaptive execution in grids." Software: Practice and Experience 34.7 (2004): 631-651. (Year: 2004).*
"International Application Serial No. PCT/US2018/053169, International Search Report dated Feb. 5, 2019" 2 pgs.
"International Application Serial No. PCT/US2018/053169, Written Opinion dated Feb. 5, 2019" 8 pgs.
"International Application Serial No. PCT/US2018/053169, Search Strategy Document dated Feb. 5, 2019" 5 pgs.

* cited by examiner

DYNAMIC APPLICATION MOBILIZATION

TECHNICAL FIELD

Aspects and implementations of the present disclosure relate to data processing and, more specifically, but without limitation, to dynamic application mobilization.

BACKGROUND

Certain applications can be deployed within cloud computing environments. Such environments can provide computing resources that can be utilized to execute the referenced applications.

SUMMARY

The following presents a shortened summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a compact form as a prelude to the more detailed description that is presented later.

In one aspect of the present disclosure, systems and methods are disclosed for dynamic application mobilization. In one implementation, an application is modeled as a processing function. The processing function is placed at a first processing node within a processing network. One or more optimization operations are computed with respect to the processing function. The processing function is mobilized from the first processing node to a second processing node within the processing network in accordance with the one or more optimization operations.

In another aspect of the present disclosure, an application is modeled as a processing function. The processing function is placed at a first processing node within a processing network. One or more optimization operations are computed with respect to the processing function. Based on the one or more optimization operations, the first processing node is marked to reflect that the processing function is being mobilized. An instance of the processing function is initiated at a second processing node within the processing network. The instance of the processing function is activated at the second processing node. The processing function as running on the first processing node is disabled.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to dynamic application mobilization.

It can be appreciated that numerous computing tasks can be deployed in cloud-computing environments such as the "public cloud." Such public clouds (which can be administered by third parties) can provide computing resources (virtual machines, applications, storage, etc.) in various configurations. Users can utilize the referenced cloud infrastructure and resources to deploy applications and/or perform other computing functions.

Certain cloud environments may include different availability zones. Such availability zones can reflect or include data centers and/or other computing resources that are situated in various regions geographic locations. Such environments can also be configured to centralize certain computing tasks, operations, etc. within certain regions/availability zones.

Additionally, certain cloud environments enable applications to utilize computing resources from multiple devices (e.g., servers or other machines that are connected within the cloud). In such a scenario the physical resources of the respective devices, machines, etc. (and the connections between them) can be abstracted (e.g., in a manner that is otherwise imperceptible to the user).

Modern applications utilize stateless and decoupled design patterns such as "serverless" functions or microservices. Such application designs can enable cloud resources to be dynamically allocated and managed, further improving scalability and application-level resiliency.

However, various shortcomings and challenges arise when the described public cloud and microservice designs are deployed over large scale hierarchal networks (e.g., for applications such as IoT, network security, social networking, and others). In such hierarchal deployments numerous properties, factors, metrics, etc., can be relevant to account for. Such properties can include but are not limited to: network bandwidth, latency and availability between network components, data location within the network, maintaining consistency of state over high latency links, availability of computing resources, peak-hour resource utilization within the network, user/data network location and latency to the service, etc.

When the referenced properties are accounted for, the deployment of microservices and serverless functions within existing public cloud environments can become inefficient, non-scalable, and/or elastic. For example, deploying microservices and/or serverless functions using a public cloud can result in the traffic for such microservice/function being centralized to a single network location (resulting in bandwidth and/or latency limitations, restrictions, etc.). Additionally, attempting to scale out the referenced microservice/function to different network location(s) may result in inconsistent state (e.g., for a given compute function).

Accordingly, described herein are technologies that enable applications to be modeled, configured, and/or deployed as a network of connected, distributed processing functions. Such processing functions can be placed at different locations ('processing nodes') within a processing network. Various aspects of the performance, cost, etc., of the processing functions within the processing network can be monitored. In doing so, various improvements, optimizations, etc., can be identified (e.g., with respect to application performance, cost, etc.). The referenced processing functions can then be mobilized within the processing network in accordance with the identified improvements, optimizations, etc. In doing so, It can therefore be appreciated that the described technologies are directed to and address specific technical challenges and longstanding deficiencies in multiple technical areas, including but not limited to application deployment, cloud computing, and network architecture. As described in detail herein, the disclosed technologies provide specific, technical solutions to the referenced technical challenges and unmet needs in the referenced technical fields and provide numerous advantages and improvements upon conventional approaches. Additionally, in various implementations one or more of the hardware elements, components, etc., referenced herein operate to enable, improve, and/or enhance the described technologies, such as in a manner described herein.

Figure 1:
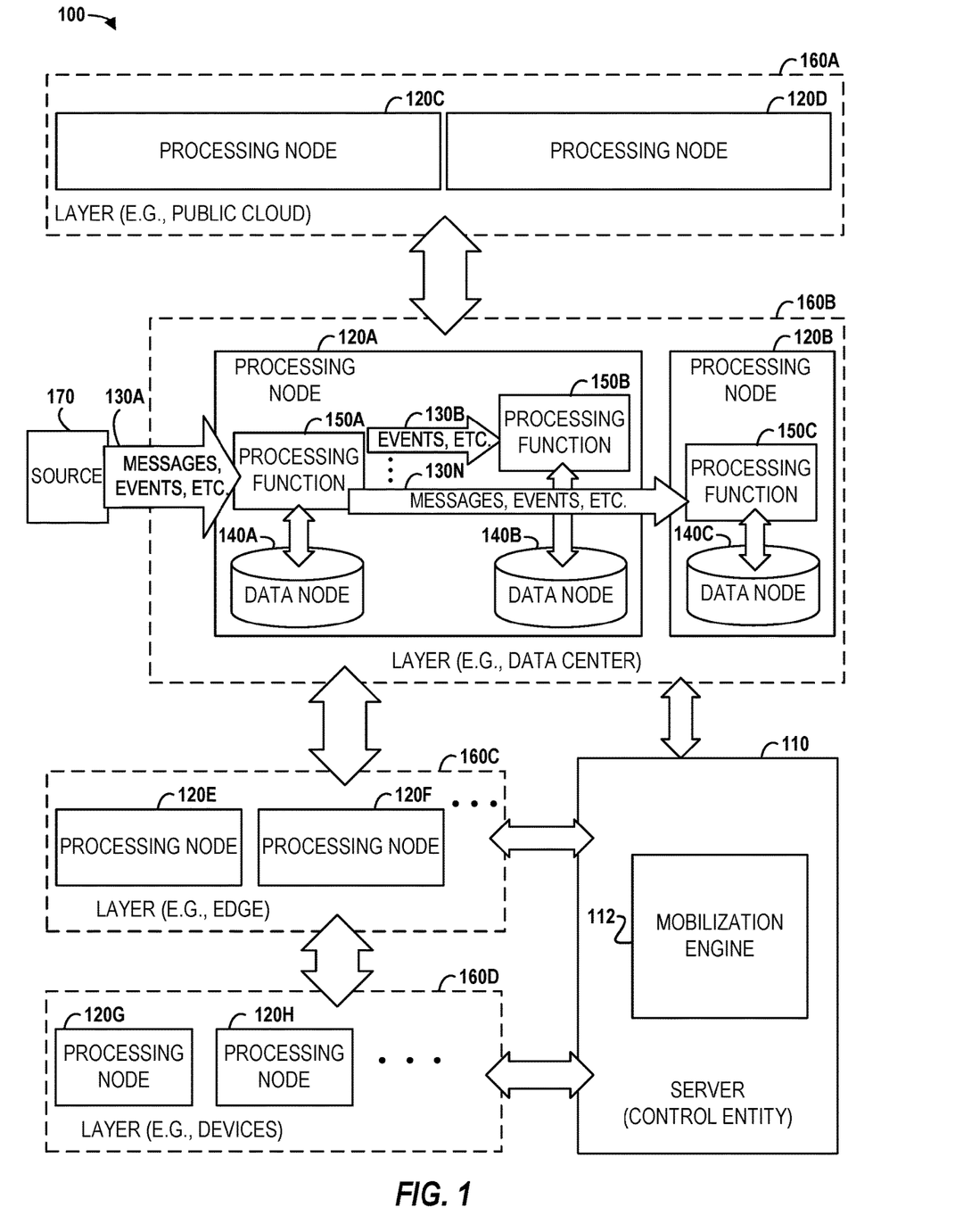
FIG. 1 illustrates an example system, in accordance with an example embodiment.

By way of illustration, FIG. 1 depicts an example system 100, in accordance with some implementations. As shown in FIG. 1, system 100 can include server 110 (also referred to herein interchangeably as a "control entity" or "control entities" and described in greater detail below). Server 110 can be, for example, a server computer, computing device, storage service (e.g., a "cloud" service), etc., and can include mobilization engine 112.

Figure 4:
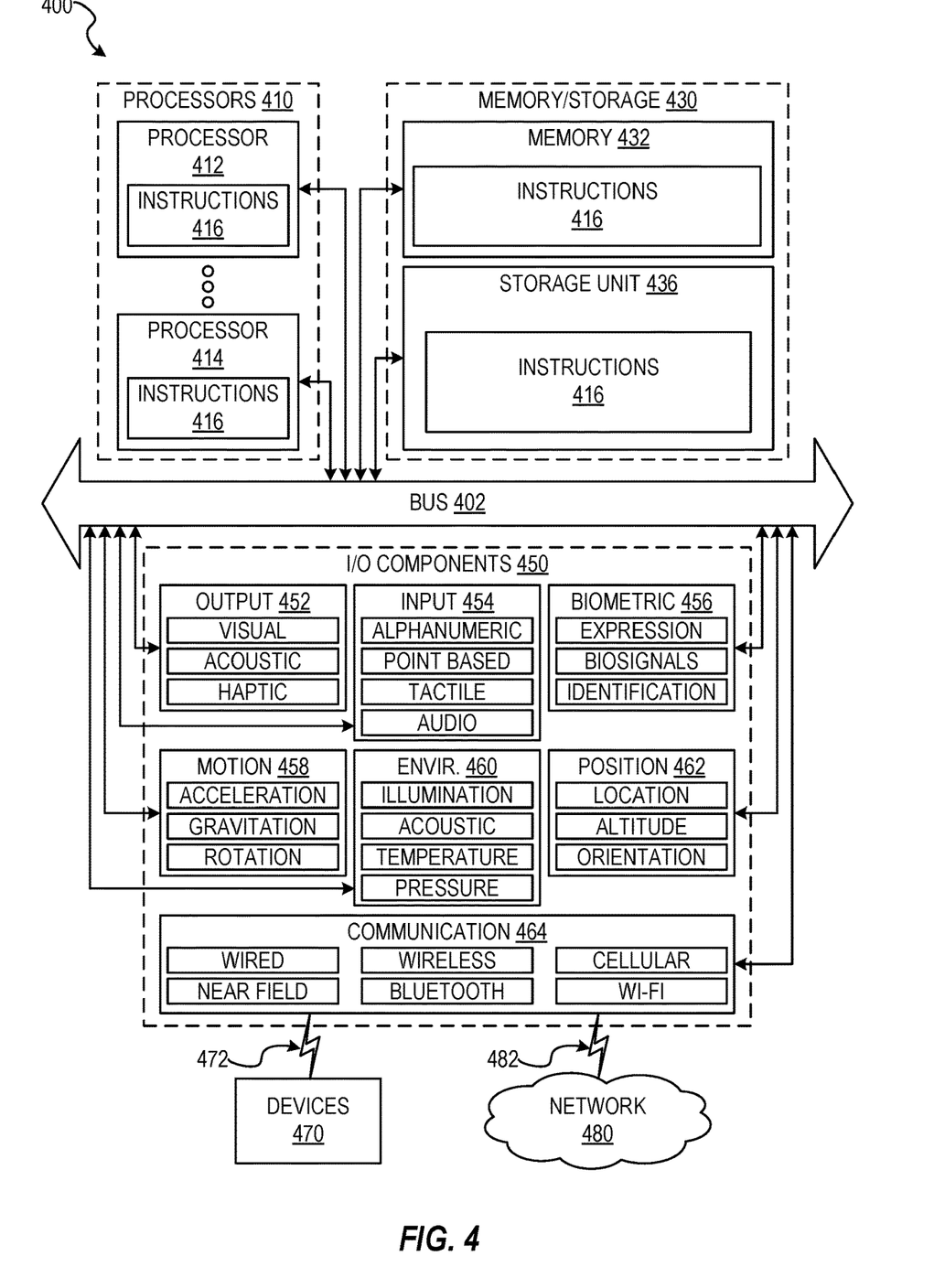
FIG. 4 is a block diagram illustrating components of a machine able to read instructions from a machine-readable medium and perform any of the methodologies discussed herein, according to an example embodiment.

Mobilization engine 112 can be a program, module, or set of instructions that configures/enables server 110 to perform various operations such as are described herein. Such instructions, etc., can be stored in memory of server 110 (e.g. memory 430 as depicted in FIG. 4 and described below). One or more processor(s) of server 110 (e.g., processors 410 as depicted in FIG. 4 and described below) can execute such instruction(s). In doing so, server 110 can be configured to perform various operations, such as those described herein. For example, mobilization engine 112 can configure server 110 to model the referenced application as a network of connected, distributed processing functions. By way of further example, mobilization engine 112 can deploy the referenced processing functions to various processing nodes, and can further mobilize such processing functions (e.g., to improve or optimize performance of such functions), as described herein.

Further aspects and features of system 100 are described in more detail below.

As used herein, the term "configured" encompasses its plain and ordinary meaning. In one example, a machine is configured to carry out a method by having software code for that method stored in a memory that is accessible to the processor(s) of the machine. The processor(s) access the memory to implement the method. In another example, the instructions for carrying out the method are hard-wired into the processor(s). In yet another example, a portion of the instructions are hard-wired, and a portion of the instructions are stored as software code in the memory.

Figure 3:
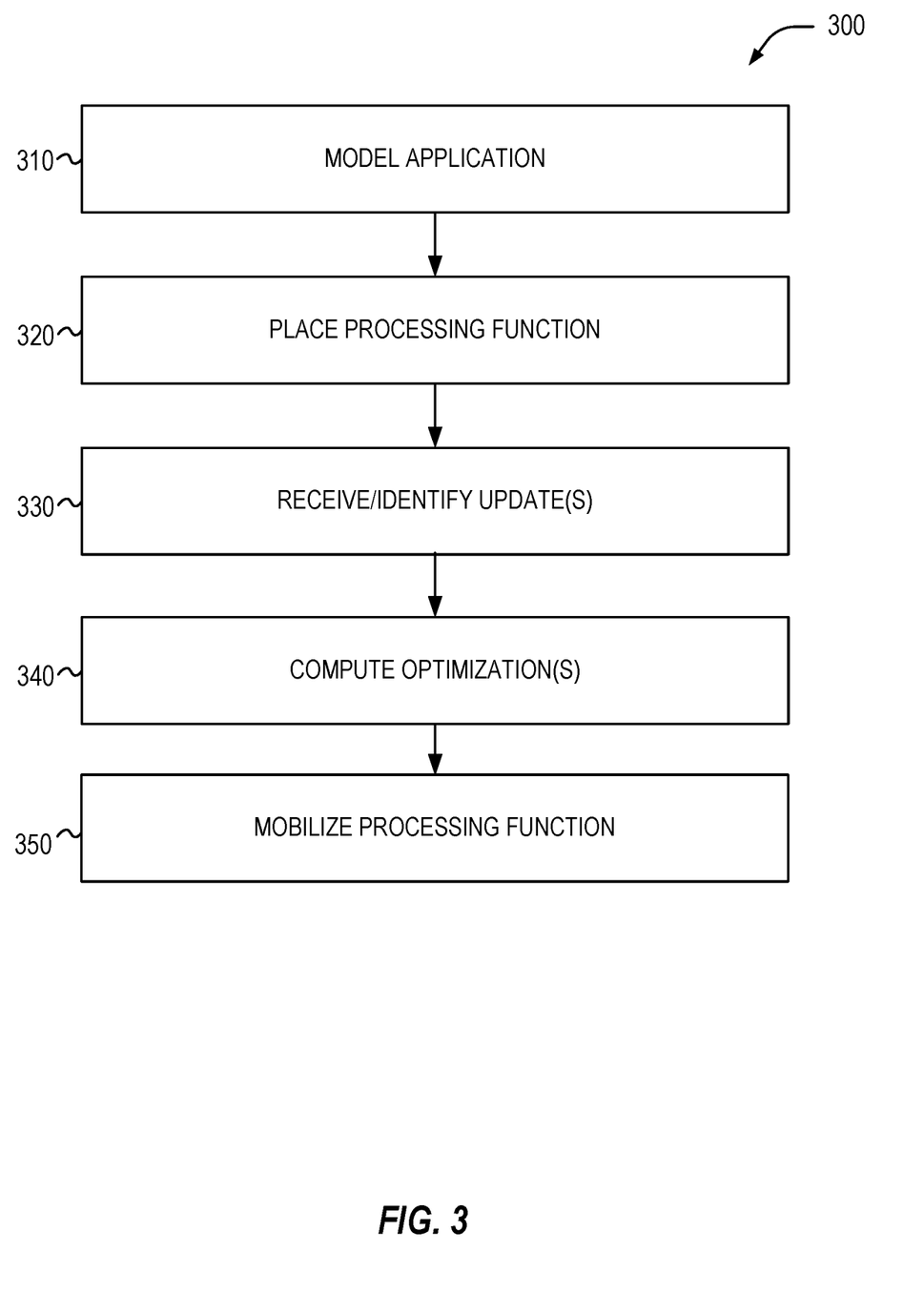
FIG. 3 is a flow chart illustrating a method, in accordance with an example embodiment, for dynamic application mobilization.

FIG. 3 is a flow chart illustrating a method 300, according to an example embodiment, for dynamic application mobilization. The method is performed by processing logic that can comprise hardware (circuitry, dedicated logic, etc.), software (such as is run on a computing device such as those described herein), or a combination of both. In one implementation, the method 300 is performed by one or more elements depicted and/or described in relation to FIG. 1 (including but not limited to server 110 and/or mobilization engine 112), while in some other implementations, the one or more blocks of FIG. 3 can be performed by another machine or machines.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At operation 310, an application is modeled, e.g., as various processing function(s). By way of illustration, such an application can be one that receives and/or accesses various messages, events, commands, other data, etc., from various devices, services, systems, etc., and processes and/or performs various other operations with respect to such received messages, events, etc., and/or other outputs generated by the referenced processing/operations. In certain implementations, the referenced application can perform numerous functions (which may be interrelated or independent of one another). Additionally, in certain implementations the referenced application can provide and/or perform comparable, similar, and/or related functionality with respect to different devices, systems, accounts, messages, events, etc. Accordingly, by modeling the referenced application, various processing functions (e.g., modules) can be generated or defined. For example, as shown in FIG. 1, various processing functions (such as processing functions 150A, 150B, and 150C) can be modeled by mobilization engine 112. Such processing functions can be placed at various processing nodes and/or mobilized within a processing network, as described herein.

In certain implementations, various aspects of operation 310 (as well as the other operations described with respect to FIG. 3) are performed by server 110 and/or mobilization engine 112 (e.g., as depicted in FIG. 1). In other implementations, such aspects can be performed by one or more other elements/components, such as those described herein.

By way of illustration, a ride-sharing application can be configured to provide functionality including matching available taxi drivers with passengers, generating navigation instructions, and coordinating payments from passengers and to drivers. In one example, such a ride-sharing application can be modeled in accordance with such functionalities, thereby generating one processing function that matches drivers and passengers, another processing function that generates navigation instructions, another processing function that coordinates payments, etc. In modeling the referenced processing functions, the respective processing functions can also be configured to access, communicate, and/or otherwise interact with various data sources (e.g., sources of messages, events, etc.) and/or data nodes, as described herein. By way of illustration, a processing function that matches drivers and passengers can be configured to receive and/or access location information that reflects the current location of such driver(s) and/or passenger(s) (e.g., originating from a GPS receiver within a device associated with a driver/passenger). By way of further illustration, a payment function can be configured to initiate payment transactions from passengers/to drivers (e.g., via a payment processing service, system, etc.). As described in detail herein, by modeling the referenced application as multiple processing functions, such processing functions can be placed at various locations (e.g., processing nodes) and/or mobilized to/from such locations based on any number of factors, criteria, etc. Doing so can improve and/or optimize performance of the referenced processing function(s), application, and/or other items/aspects (with respect to any number of factors, criteria, etc.), as described herein. By way of illustration, placing and/or mobilizing a processing function that matches drivers and passengers to a processing node having a low latency connection to devices associated with such drivers/passengers may improve performance with respect to such a processing function (e.g., by shortening response times with respect to communications to/from such drivers/passengers). By way of further illustration, placing and/or mobilizing a processing function that initiates payments from passengers/to drivers to a lower cost processing node may improve efficiency with respect to the costs associated with such a processing function/the application.

By way of further example, the referenced ride-sharing application (and/or aspects thereof) can be modeled in accordance with other factor(s), such as location. For example, one processing function (or a set of processing functions) can be modeled with respect to aspects of the application being performed with respect to drivers/passengers in one location (e.g., New York) while another processing function (or another set of processing functions) can be modeled with respect to aspects of the application being performed with respect to drivers/passengers in another location (e.g., San Francisco). The respective processing function(s) can then be placed and/or mobilized at various processing nodes, e.g., to improve or optimize based on any number of factors, criteria, etc., as described herein. For example, processing function(s) associated with one location (e.g., New York) can be placed at/mobilized to processing node(s) that improve performance with respect to drivers/passengers in that location. It should be understood that the described scenarios are provided by way of example and that any number of other factors can be used and/or accounted for (e.g., in modeling applications as processing functions, placing/mobilizing such processing functions, etc.).

At operation 320, a processing function (such as is modeled at operation 310) can be placed or deployed, e.g., to various processing nodes (e.g., processing nodes 120A and 120B). Such processing function(s) can be, for example, execution unit(s) or modules configured to receive messages, commands, events, and/or other such data and process the received messages, commands, events, data, etc. (e.g., as a batch). In certain implementations, such messages, commands, events, etc. can be structured or formatted in various ways, such as a stream, feed, queue, etc. Additionally, in certain implementations, such messages, commands, events, etc. can be received from a source such as a message source, event source (e.g., an event queue), etc. Examples of such message sources, event sources, etc., include but are not limited to: devices (e.g., computing devices, Internet of Things ('IoT') devices, etc.), sensors, systems, other processing functions, and/or any other such device, system, or element capable of generating, providing, and/or otherwise making accessible the messages, commands, events, data, etc., described herein.

For example, as shown in FIG. 1, processing function 150A is configured to received messages, events, commands, data, etc. 130A (e.g., as a stream, feed, queue, etc.). Such messages, events, etc., may originate from any number of sources such as source 170 as shown in FIG. 1. As noted above, source 170 can be, for example, a message source, event source, etc., such as a device (e.g., computing device, IoT device, etc.), sensor, system, another processing function, and/or any other such device, system, or element capable of generating, providing, and/or otherwise making accessible the messages, commands, events, data, etc., described herein. Additionally, in certain implementations the referenced events can include or reflect various occurrences, phenomena, etc., that are reflected or can otherwise be identified in various messages, data, streams, etc. For example, such events can include or reflect that a reading or metric from a sensor is above (or below) a defined threshold, that a parameter in a system has reached a certain value, that a certain number of messages have been received over a defined timeframe, etc. It should be understood that the illustrations and scenarios provided herein are for the purposes of example and that the described technologies can be implemented in any number of other ways. Additionally, in certain implementations, the referenced processing functions (150A, 150B, etc.) can be implemented in accordance with processing paradigms such as serverless functions, microservices, etc.

The referenced processing functions may also perform various operations with respect to various data nodes (e.g., data nodes 140A, 140B, 140C, as shown in FIG. 1). Such data nodes can be, for example, can storage resource(s) such as an object-oriented database, a relational database, memory, etc. with respect to which data can be retrieved and/or stored. It should be understood that, in various implementations, such data nodes (with respect to which the referenced processing functions read, write, etc., data) may be present at the same processing node (e.g., processing function 150A and data node 140A at processing node 120A). In other implementations, the referenced processing function may interact with a data node present at a different processing node (as described herein).

In certain implementations, the referenced processing function(s) can be configured to operate in a stateless manner. In such a scenario, a batch of received/received messages, events, commands, etc. (e.g., messages/events 130A as shown in FIG. 1) can be processed by retrieving/pulling a state from a data node (e.g., data node 140A), transforming the state and committing a different/updated state to the data node 140A (e.g., reflecting the received events).

In certain implementations, a processing function can generate additional event(s), messages, commands, etc. (e.g., a stream of events). Such messages, events, etc. generated by the processing function can be pushed (e.g., as a queue) and/or otherwise provided to other processing function(s) within a processing network. For example, as shown in FIG. 1, processing function 150A can generate messages/events 130B and push/provide such messages/events to processing function 150B. By way of further example, processing function 150A can generate messages/events 130N and push/provide such messages/events to processing function 150C, as shown.

As noted above, the referenced processing functions can be deployed (e.g., by mobilization engine 112) at various processing nodes. Such processing nodes can be, for example, physical and/or virtual devices that are capable of executing the referenced processing functions (e.g., including processing power/resources, memory, etc.). In certain implementations, respective processing nodes can be connected to other processing node(s) (e.g., via network connections). In certain implementations, a processing node may also include a data node, as described above. For example, as shown in FIG. 1, processing node 120B (at which processing function 150C is deployed) can include data node 140C.

In certain implementations, the referenced processing node can provide resource and/or logical isolation between different processing functions (which can run in parallel on a single node). For example, as shown in FIG. 1, processing function 150A and processing function 150B can run in parallel on processing node 120A.

In certain implementations, the referenced processing nodes can be associated with a various metrics, functions, etc., such as performance functions, cost functions. Such functions can reflect, for example, various aspects of the performance, cost, efficiency, etc., associated with a particular processing node, e.g., in relation to various data nodes/elements and/or other processing nodes. For example, a performance/cost function for a processing node can be weighted function that includes/accounts for various metrics such as the degree of connectivity between the processing node and other processing nodes, bandwidth between the processing node and other processing nodes and/or across layers, latency to other processing nodes and/or across layers, memory consumption (e.g., in a scenario where the processing node is an end device), processing function consumption, etc.

As noted above, the various processing nodes can be connected to and/or otherwise configured to communicate with one another, thereby forming a processing network (e.g., an interconnected graph of processing nodes). In various implementations, such nodes can be connected in in a full mesh or partial mesh topology.

In certain implementations, the referenced processing network can include processing nodes having different capabilities, characteristics, resources, etc. For example, different layers or hierarchies of processing nodes can be included within a processing network. By way of illustration, FIG. 1 depicts various layers such as layer 160A (e.g., a public cloud which can include processing nodes 120C and 120D), layer 160B (e.g., a data center layer), layer 160C (e.g., an edge layer) and layer 160D (e.g., a device layer in which processing nodes 120G and 120H can be, for example, mobile devices, etc.). It can be appreciated that the processing nodes at each layer can have different capabilities, characteristics, resources, etc. which can be accounted for in deploying and/or mobilizing processing functions across such processing nodes, as described herein.

As noted above, control entitie(s) (such as server 110 executing mobilization engine 112) can dynamically place/deploy and/or mobilize the referenced processing functions across a processing network (e.g., across multiple processing nodes throughout the processing network). For example, a control entity can distribute or otherwise provide a processing function (e.g., the code, instructions, etc., that makes up the function) to a processing node within the processing network. In placing such a processing function at a processing node, the control entity can also configure the processing function to receive/read messages, events, commands, data, etc., e.g., from a source queue. For example, as shown in FIG. 1, the control entity (e.g., server 110/mobilization engine 112) can place processing function 150A at processing node 120A and configure the processing function to read messages, events, etc., (to be processed by the processing function) from queue 130A.

Additionally, in certain implementations, the referenced control entities can be implemented, for example, as a set of processing functions and/or a service that monitors various aspects of the processing network (e.g., performance, availability, etc. of various processing nodes). Such control entities may also configure/control the dynamic deployment/mobilization of processing functions across the processing network. In doing so, the control entities can improve and/or optimize various aspects such as the performance of an application, resource utilization, etc. Additionally, once such processing functions have been deployed across the processing network, the controlling entities can dynamically adjust the layout and/or location of such processing functions within the processing network (e.g., by mobilizing a processing function from one processing node to another).

The referenced control entities can account for numerous factors, characteristics, metrics, key performance indicators (KPIs), etc., in placing a processing function at a processing node, mobilizing it from one processing node to another, etc. For example, in certain implementations mobilization engine 112 can perform such placement/mobilization operations to prioritize, improve, optimize, and/or otherwise account for resource utilization, e.g., with respect to resources such as bandwidth, storage operations such as input/output operations per second (IOPS) for various data nodes, processing resources/capabilities available at different processing nodes, etc. Additionally, in certain implementations such placement/mobilization operations can be configured account for, improve, etc., latency for event handling, to increase/improve the resiliency of the processing network/node, to improve/optimize the overall cost of running the application/function (e.g., by increasing utilization of "lower cost" resources), etc. It should be understood that such factors, characteristics, etc. are provided by way of example and that any number of other factors can also be accounted for. Additionally, in certain implementations a user, developer, administrator, etc., can define or dictate the factor(s) to be accounted for (e.g., by the control entities) in placing and/or mobilizing of processing functions. In other implementations, mobilization engine can determine such factors and place/mobilize processing functions accordingly.

It should be noted that, as described herein, in certain implementations processing function(s) can be mobilized based on numerous factors, including those that may not necessarily change or improve performance of the function and/or the application that it is a part of. For example, in certain scenarios processing function(s) can be mobilized in order to address or improve resource utilization of other processing nodes, other processing functions, network bandwidth/capacity, and/or other factors, metrics, etc. Accordingly, such factors (e.g., improving resource utilization) may not necessarily improve or optimize the performance of a particular processing function (individually). However, by mobilizing the processing function, other factors (e.g., resource utilization, bandwidth, etc.) can be accounted for, improved, and/or optimized.

In certain implementations, a control entity (e.g., server 110 and/or mobilization engine 112) can store or otherwise maintain a snapshot or other such record that reflects, for example, various connections, relationships, etc., between processing nodes (e.g., a dependency graph of the processing network). In certain implementations, such a snapshot/record may be provided by a user, administrator, etc., while in other implementations various network entities (physical and/or logical), such as processing nodes, can report corresponding information to the control entity. It should also be understood that such information can also be reported in response to a request originating from the control entity.

At operation 330, one or more updates are received and/or otherwise identified. In certain implementations, such updates may be associated with aspects of various processing function(s), processing node(s), and/or a processing network. For example, at various intervals, processing functions and processing nodes (e.g., physical resources) can report or otherwise provide updates regarding various capabilities, metrics, telemetry, etc. Examples of such updates include but are not limited to: resource utilization/consumption (e.g., CPU, memory, line rate, consumption, etc.), latency to adjacent entities, processing functions, or processing nodes/physical resources, queue states, etc. It should be understood that such updates are provided by way of example and that other metrics, etc., can also be utilized. Additionally, in certain implementations such updates can be requested (e.g., as a 'pull' request initiated by a control entity, when the control entity 'polls' various entities such as processing functions, etc.), provided, and/or received on a ongoing basis and/or periodically, while in other implementations various events may trigger such updates to be requested, provided, and/or received. For example, various thresholds can be defined and server as triggers to initiate reporting of the telemetry of processing functions and/or processing nodes. It should be understood that such thresholds can be dynamically adjusted (e.g., by the control entity) over the processing network (e.g., based on performance and/or other factors).

Additionally, in certain implementations the referenced control entity may request and/or receive information, updates, etc., from various sources outside the described processing network. Examples of such updates include but are not limited to: dynamic cost models and associated data, network measurements/metrics, service level objectives (SLOs) and service level agreements (SLAs).

Based on the referenced updates, the control entity can adjust various aspects of the placement and/or operation of certain processing functions, such as by mobilizing such processing function(s) and placing them at different processing node(s) within the processing network. In certain implementations, such adjustments/mobilizations can be dictated or otherwise defined based on various priorities, optimizations, etc., such as are described in detail above (e.g., optimizing to account for or improve performance, bandwidth, cost, etc.). Accordingly, upon identifying or determining a performance improvement or optimization (e.g., with respect to execution of application within the described processing network), the referenced control entities can mobilize and/or place various processing functions (e.g., at various processing nodes within the processing network). In doing so, the flow of data and/or resource consumption of such processing functions throughout the processing network can be adjusted.

At operation 340, various optimization operation(s) can be computed, e.g., with respect to a processing function. By way of illustration, a control entity can apply an optimization operation utilizing a cost function matrix that models various aspects of the processing network and applies a minimum optimizer while weighting the different resources (e.g., according to priorities that may be set/defined by a user/administrator and/or according to actual cost weights). It should be noted that, in certain implementations the referenced control entity can also include or otherwise account for the costs, resources (e.g., processing, bandwidth), etc., that mobilization of a processing function entails when computing/determining the referenced optimization operation(s).

By performing the described optimization operations(s), the described control entity can generate and/or otherwise provide or output various mobilization and/or placement operations. Such mobilization/placement operations can adjust the position of various processing functions and/or otherwise change the state of the processing network. Additionally, in certain implementations, by performing the referenced optimization operation(s), the described control entity can deploy additional entities or processing functions. In certain implementations, adding such processing functions may include or entail resharding various event queues, e.g., within the processing network.

The referenced placement operations (as generated by the described control entity) can be applied to processing functions, e.g., by mapping such processing functions to processing nodes. Additionally, in certain implementations the described control entity can mobilize data (e.g., between different data nodes). For example, in certain implementations data being accessed (e.g., read, written, etc.) by a processing function can be transferred from one data node to another, e.g., in conjunction with the described optimization operation(s).

It should be understood that control entity can also implement yet other optimization operations. For example, in certain implementations a control entity can deploy a cache in one processing node/data node for messages/events that are to be provided to another processing function/data node. Doing so can further improve/optimize performance of an application executing across the described processing network, e.g., in a scenario in which bandwidth or processing limitations may be present.

In certain implementations, the referenced processing functions can be configured to perform various operations. For example, such processing functions can be configured to receive, process, and/or otherwise handle a set or stream of messages, events, commands, etc. (e.g., messages/events 130A as shown in FIG. 1), read and/or update a set of states (e.g., as stored in a data node such as data node 140A) and/or generate additional messages, events, etc. (e.g., messages/events 130B) or triggers to other processing functions.

In certain scenarios, various processing functions may be "merged." In doing so, the processing functions can be activated or executed in sequence (e.g., without going through a queue). The merging of such processing functions can be relevant, for example, in scenarios in which the processing functions are placed within the same processing node. The merging of such processing functions can also be relevant, for example, when the processing functions are connected in a 1:1 relationship (such that, for example, one processing functions alone is feeding data to a second processing function).

The reasoning for selecting a placement are: network bandwidth, latency and availability between network components, data location within the network, maintaining consistency of state over high latency links, availability of computing resources, peak-hour resource utilization within the network, user/data network location and latency to the service, etc.

At operation 350, the processing function (e.g., as placed at the first processing node at operation 320) is mobilized. For example, a processing function can be mobilized from a first processing node to a second processing node within the processing network, e.g., in accordance with the optimization operation(s) (such as those computed at operation 340).

Figure 2:
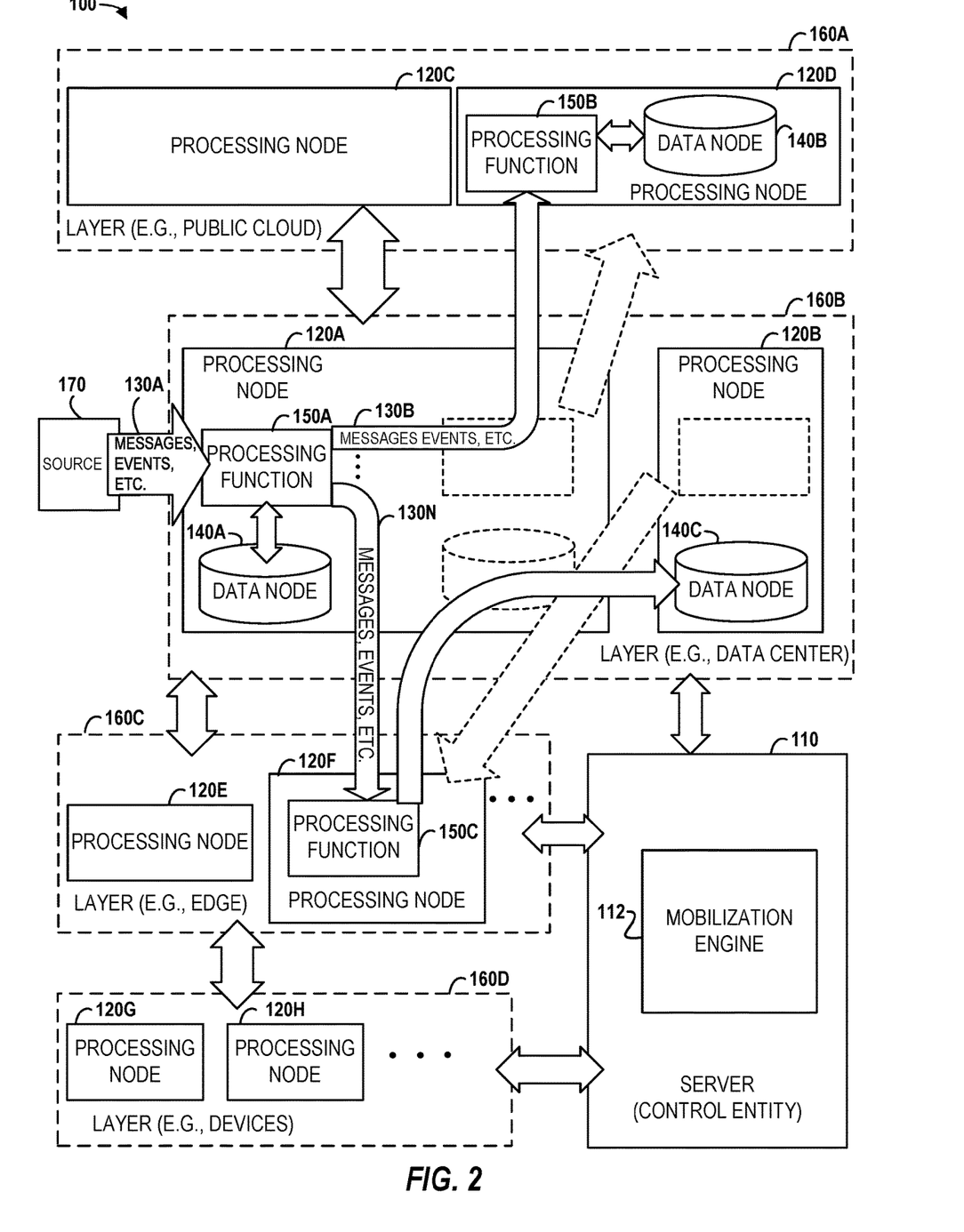
FIG. 2 illustrates example scenarios described herein, according to example embodiments.

By way of illustration, FIG. 2 depicts an example scenario in which various processing functions are mobilized. For example, as shown in FIG. 2, processing function 150B can be mobilized from processing node 120A (e.g., a processing node within a data center layer) to processing node 120D (e.g., within a public cloud layer). Doing so can be advantageous and/or improve/optimize execution of the overall application (of which processing function 150B is a part) in various scenarios. For example, in a scenario in which the operational cost of running processing function 150B at a public cloud layer is lower than at a data center layer, mobilizing the processing function in the manner shown can reduce the costs associated with running the application. It should also be noted that, as shown in FIG. 2, in certain implementations the described mobilization operations can also entail mobilizing data nodes. For example, as shown in FIG. 2, data node 140B can be mobilized from processing node 120A to processing node 120D, e.g., in order to further improve or optimize aspects of the execution of the application, as described herein.

As also shown in FIG. 2, processing function 150C can be mobilized from processing node 120B (e.g., within a data center layer) to processing node 120F (within an edge layer). Doing so can be advantageous and/or improve/optimize execution of the overall application (of which processing function 150C is a part) in various scenarios. For example, in a scenario in which the running processing function 150C at the edge layer can improve performance of the application (e.g., due to improved bandwidth, latency, processing resources, etc.), mobilizing the processing function in the manner shown can improve the performance of the overall application.

By way of further illustration, as noted above, a control entity can mobilize a processing function, e.g., by transferring it from one location within a processing network to another (e.g., from one processing node to another). In certain implementations, such a mobilization operation can be initiated upon identifying a processing function to be mobilized and determining a new location (e.g., another processing node) to which the processing function is to be transferred to (e.g., based on various factors, optimizations, etc., as described above). In doing so, the original location (e.g., the processing node that the processing function is being mobilized from) can be marked or otherwise ascribed or associated with a status/state/indicator that reflects that the processing function is "in transit" (e.g., to another processing node).

The control entity can then deploy or otherwise place a new instance of the processing function at the determined/selected location (e.g., the processing node that the processing function is being mobilized to). In certain implementations, such an instance of the processing function can initially be created with a status/state/indicator that reflects that the processing function is "disabled" or otherwise not (yet) operational.

The control entity can then stop, disable, or otherwise "kill" the original instance of the processing function (e.g., the instance marked as "in transit"). Though doing so may cause the processing function to be re-spawned, the re-spawned instance of the processing function can sample the network configuration of the processing network and determine that the original location (at which the processing function was initially placed) is marked as "in transit" (reflecting that the re-spawned instance should not be placed at the original processing node and should remain inactive).

The (new) instance of the processing function (previously marked as "disabled") can then be activated at the new location. In certain implementations, such a new instance can be configured/activated with the same (or comparable) queue and data configuration as present in the previous instance. For example, as shown in FIG. 2, processing function 150C (migrated from processing node 120B to processing node 120F) can be configured to pull/receive messages/events 130N (from processing function 150A) and perform various data operations with respect to data node 140C.

Upon determining that the new instance of the processing function is active at the new location, the control entity can mark or otherwise indicate the old location as "deleted." In doing so, the processing function can stop executing at the original/previous location.

It should be understood that in scenarios in which the described mobilization operation fails, the instance of the processing function that remains pending at the original location can be reactivated (e.g., by the control entity).

While many of the examples described herein are illustrated with respect to single server 110 and/or individual devices, this is simply for the sake of clarity and brevity. However, it should be understood that the described technologies can also be implemented (in any number of configurations) across multiple devices and/or other machines/services.

It should also be noted that while the technologies described herein are illustrated primarily with respect to dynamic application mobilization, the described technologies can also be implemented in any number of additional or alternative settings or contexts and towards any number of additional objectives. It should be understood that further technical advantages, solutions, and/or improvements (beyond those described and/or referenced herein) can be enabled as a result of such implementations.

Certain implementations are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example implementations, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some implementations, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module can also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering implementations in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In implementations in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an API).

The performance of certain of the operations can be distributed among the processors, not only residing within a single machine, but deployed across a number of machines. In some example implementations, the processors or processor-implemented modules can be located in a single geographic location (e.g., within a home environment, an office environment, or a server farm). In other example implementations, the processors or processor-implemented modules can be distributed across a number of geographic locations.

The modules, methods, applications, and so forth described in conjunction with FIGS. 1-3 are implemented in some implementations in the context of a machine and an associated software architecture. The sections below describe representative software architecture(s) and machine (e.g., hardware) architecture(s) that are suitable for use with the disclosed implementations.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture can yield a smart device for use in the "internet of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

FIG. 4 is a block diagram illustrating components of a machine 400, according to some example implementations, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein can be executed. The instructions 416 transform the general, non-programmed machine into a particular machine programmed to carry out the described and illustrated functions in the manner described. In alternative implementations, the machine 400 operates as a standalone device or can be coupled (e.g., networked) to other machines. In a networked deployment, the machine 400 can operate in the capacity of a server machine or a client machine in a server-client network environment, or as a peer machine in a peer-to-peer (or distributed) network environment. The machine 400 can comprise, but not be limited to, a server computer, a client computer, PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 can include processors 410, memory/storage 430, and I/O components 450, which can be configured to communicate with each other such as via a bus 402. In an example implementation, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 412 and a processor 414 that can execute the instructions 416. The term "processor" is intended to include multi-core processors that can comprise two or more independent processors (sometimes referred to as "cores") that can execute instructions contemporaneously. Although FIG. 4 shows multiple processors 410, the machine 400 can include a single processor with a single core, a single processor with multiple cores (e.g., a multi-core processor), multiple processors with a single core, multiple processors with multiples cores, or any combination thereof.

The memory/storage 430 can include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 can also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of the processors 410 are examples of machine-readable media.

As used herein, "machine-readable medium" means a device able to store instructions (e.g., instructions 416) and data temporarily or permanently and can include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine (e.g., processors 410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 can include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 can include many other components that are not shown in FIG. 4. The I/O components 450 are grouped according to functionality merely for simplifying the following discussion and the grouping is in no way limiting. In various example implementations, the I/O components 450 can include output components 452 and input components 454. The output components 452 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 454 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example implementations, the I/O components 450 can include biometric components 456, motion components 458, environmental components 460, or position components 462, among a wide array of other components. For example, the biometric components 456 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 458 can include acceleration sensor components (e.g., accelerometer), gravitation sensor components, rotation sensor components (e.g., gyroscope), and so forth. The environmental components 460 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that can provide indications, measurements, or signals corresponding to a surrounding physical environment. The position components 462 can include location sensor components (e.g., a Global Position System (GPS) receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 450 can include communication components 464 operable to couple the machine 400 to a network 480 or devices 470 via a coupling 482 and a coupling 472, respectively. For example, the communication components 464 can include a network interface component or other suitable device to interface with the network 480. In further examples, the communication components 464 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 can be another machine or any of a wide variety of peripheral devices (e.g., a peripheral device coupled via a USB).

Moreover, the communication components 464 can detect identifiers or include components operable to detect identifiers. For example, the communication components 464 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 464, such as location via Internet Protocol (IP) geolocation, location via Wi-Fi® signal triangulation, location via detecting an NFC beacon signal that can indicate a particular location, and so forth.

In various example implementations, one or more portions of the network 480 can be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 can include a wireless or cellular network and the coupling 482 can be a Code Division Multiple Access (CDMA) connection, a Global System for Mobile communications (GSM) connection, or another type of cellular or wireless coupling. In this example, the coupling 482 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 can be transmitted or received over the network 480 using a transmission medium via a network interface device (e.g., a network interface component included in the communication components 464) and utilizing any one of a number of well-known transfer protocols (e.g., HTTP). Similarly, the instructions 416 can be transmitted or received using a transmission medium via the coupling 472 (e.g., a peer-to-peer coupling) to the devices 470. The term "transmission medium" shall be taken to include any intangible medium that is capable of storing, encoding, or carrying the instructions 416 for execution by the machine 400, and includes digital or analog communications signals or other intangible media to facilitate communication of such software.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Although an overview of the inventive subject matter has been described with reference to specific example implementations, various modifications and changes can be made to these implementations without departing from the broader scope of implementations of the present disclosure. Such implementations of the inventive subject matter can be referred to herein, individually or collectively, by the term "invention" merely for convenience and without intending to voluntarily limit the scope of this application to any single disclosure or inventive concept if more than one is, in fact, disclosed.

The implementations illustrated herein are described in sufficient detail to enable those skilled in the art to practice the teachings disclosed. Other implementations can be used and derived therefrom, such that structural and logical substitutions and changes can be made without departing from the scope of this disclosure. The Detailed Description, therefore, is not to be taken in a limiting sense, and the scope of various implementations is defined only by the appended claims, along with the full range of equivalents to which such claims are entitled.

As used herein, the term "or" can be construed in either an inclusive or exclusive sense. Moreover, plural instances can be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and can fall within a scope of various implementations of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of implementations of the present disclosure as represented by the appended claims. The specification and drawings are, accordingly, to be regarded in an illustrative rather than a restrictive sense.

What is claimed is:

1. A system comprising:
   a processing device; and
   a memory coupled to the processing device and storing instructions that, when executed by the processing device, cause the system to perform operations comprising:
     modeling an application as a processing function;
     placing the processing function at a first processing node within a processing network;
     computing one or more optimization operations with respect to the processing function;
     in a first mobilization operation, mobilizing the processing function from the first processing node to a second processing node within the processing network in accordance with the one or more optimization operations;
     determining an improved performance with respect to a third processing node within the processing network based on a mobilization of the processing function, in the first mobilization operation, from the first processing node to the second processing node; and in a second mobilization operation, mobilizing the processing function from the second processing node to the third processing node within the processing network based on the improved performance as determined based on the mobilization of the processing function, in the first mobilization operation, from the first processing node to the second processing node.

2. The system of claim 1, wherein modeling the application comprises modeling the application as a first processing function and a second processing function.

3. The system of claim 1, wherein placing the processing function at the first processing node comprises configuring the processing function to receive one or more messages from a first message source.

4. The system of claim 1, wherein placing the processing function at the first processing node comprises configuring the processing function to perform one or more operations with respect to a data node.

5. The system of claim 1, wherein placing the processing function at the first processing node comprises configuring the processing function to process one or more messages received from a first message source.

6. The system of claim 1, wherein the processing function is configured to provide one or more messages to another processing function executing within the processing network.

7. The system of claim 1, wherein the memory further stores instructions to cause the system to perform operations comprising receiving one or more updates associated with one or more aspects of at least one of the processing function, the first processing node, the second processing node, or the processing network.

8. The system of claim 7, wherein computing one or more optimization operations comprises computing the one or more optimization operations based on the one or more updates.

9. The system of claim 1, wherein mobilizing the processing function from the first processing node to the second processing node comprises determining an improved performance of the application based on the mobilization of the processing function from the first processing node to the second processing node.

10. The system of claim 1, wherein mobilizing the processing function from the first processing node to the second processing node comprises determining an improved performance with respect to the processing network based on the mobilization of the processing function from the first processing node to the second processing node.

11. The system of claim 1, wherein mobilizing the processing function from the first processing node to the second processing node comprises:
marking the first processing node to reflect that the processing function is being mobilized;
initiating an instance of the processing function at the second processing node;
activating the instance of the processing function at the second processing node; and
disabling the processing function as running on the first processing node.

12. The system of claim 1, wherein mobilizing the processing function from the first processing node to the second processing node comprises:

activating an instance of the processing function at the second processing node; and
disabling the processing function as running on the first processing node.

13. The system of claim 1, wherein mobilizing the processing function from the first processing node to the second processing node comprises configuring the processing function as mobilized to the second processing node to request one or more messages from a first message source.

14. The system of claim 1, wherein mobilizing the processing function from the first processing node to the second processing node comprises configuring the processing function as mobilized to the second processing node to perform one or more operations with respect to a data node.

15. A method comprising:
modeling an application as a processing function;
placing the processing function at a first processing node within a processing network;
computing one or more optimization operations with respect to the processing function;
in a first mobilization operation, mobilizing the processing function from the first processing node to a second processing node within the processing network in accordance with the one or more optimization operations;
determining an improved performance with respect to a third processing node within the processing network based on a mobilization of the processing function, in the first mobilization operation, from the first processing node to the second processing node; and
in a second mobilization operation, mobilizing the processing function from the second processing node to the third processing node within the processing network based on the improved performance as determined based on the mobilization of the processing function, in the first mobilization operation, from the first processing node to the second processing node.

16. The method of claim 15, wherein modeling the application comprises modeling the application as a first processing function and a second processing function.

17. The method of claim 15, wherein placing the processing function at the first processing node comprises configuring the processing function to receive one or more messages from a first message source.

18. The method of claim 17, wherein the one or more messages comprise one or more events.

19. The method of claim 15, wherein placing the processing function at the first processing node comprises configuring the processing function to perform one or more operations with respect to a data node.

20. The method of claim 15, wherein placing the processing function at the first processing node comprises configuring the processing function to process one or more messages received from a first message source.

21. The method of claim 15, wherein the processing function is configured to provide one or more messages to another processing function executing within the processing network.

22. The method of claim 15, further comprising receiving one or more updates associated with one or more aspects of at least one of the processing function, the first processing node, the second processing node, or the processing network.

23. The method of claim 22, wherein computing one or more optimization operations comprises computing the one or more optimization operations based on the one or more updates.

24. The method of claim 15, wherein mobilizing the processing function from the first processing node to the second processing node comprises determining an improved performance of the application based on the mobilization of the processing function from the first processing node to the second processing node.

25. The method of claim 15, wherein mobilizing the processing function from the first processing node to the second processing node comprises determining an improved performance with respect to the processing network based on the mobilization of the processing function from the first processing node to the second processing node.

26. The method of claim 15, wherein mobilizing the processing function from the first processing node to the second processing node comprises:
   marking the first processing node to reflect that the processing function is being mobilized;
   initiating an instance of the processing function at the second processing node;
   activating the instance of the processing function at the second processing node; and
   disabling the processing function as running on the first processing node.

27. The method of claim 15, wherein mobilizing the processing function from the first processing node to the second processing node comprises:
   activating an instance of the processing function at the second processing node; and
   disabling the processing function as running on the first processing node.

28. The method of claim 15, wherein mobilizing the processing function from the first processing node to the second processing node comprises configuring the processing function as mobilized to the second processing node to request one or more messages from a first message source.

29. The method of claim 15, wherein mobilizing the processing function from the first processing node to the second processing node comprises configuring the processing function as mobilized to the second processing node to perform one or more operations with respect to a data node.

30. A non-transitory computer readable medium having instructions stored thereon that, when executed by a processing device, cause the processing device to perform operations comprising:
   modeling an application as a processing function;
   placing the processing function at a first processing node within a processing network;
   computing one or more optimization operations with respect to the processing function; and
   based on the one or more optimization operations,
      activating an instance of the processing function at a second processing node,
      disabling the processing function as running on the first processing node;
      determining an improved performance with respect to a third processing node within the processing network based on a mobilization of the processing function, in a first mobilization operation, from the first processing node to the second processing node; and
      in a second mobilization operation, mobilizing the processing function from the second processing node to the third processing node within the processing network based on the improved performance as determined based on the mobilization of the processing function, in the first mobilization operation, from the first processing node to the second processing node.

31. The computer-readable medium of claim 30, wherein mobilizing the processing function comprises determining an improved performance with respect to the processing network based on the mobilization of the processing function from the first processing node to the second processing node.

* * * * *